March 9, 1971 M. L. HOFFMAN ET AL 3,568,462
FRACTIONATING DEVICE
Filed Nov. 22, 1967 2 Sheets-Sheet 1
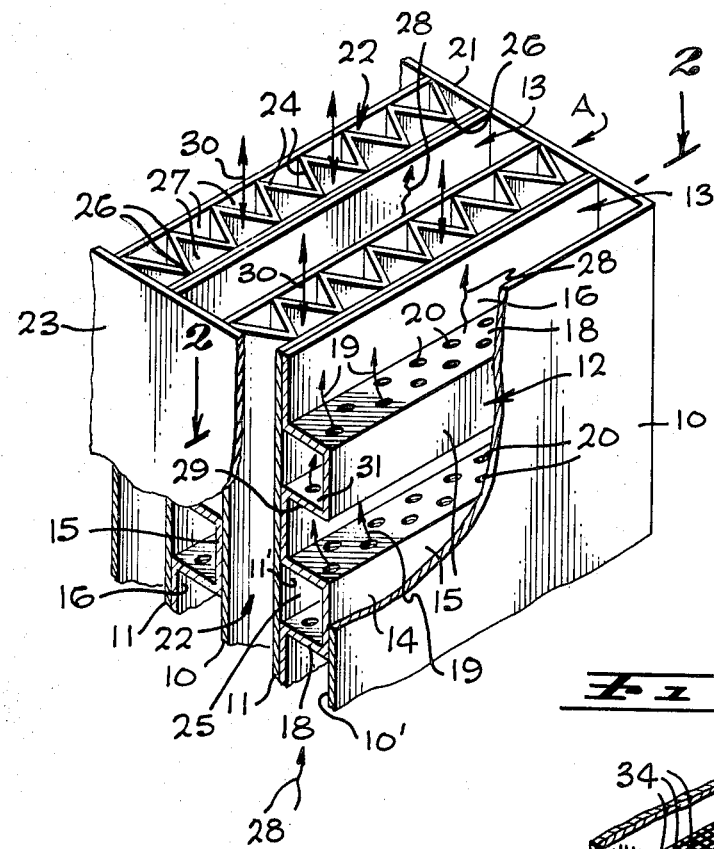
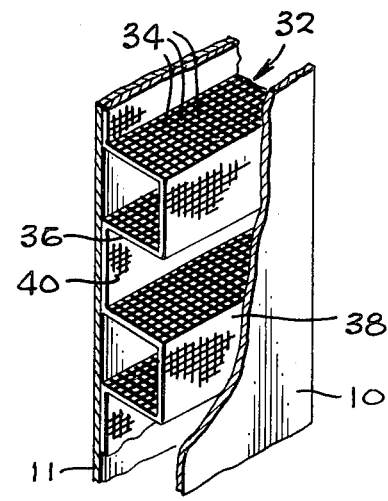
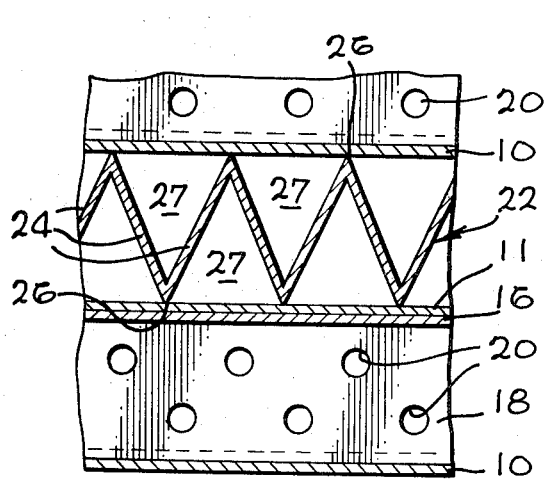
MICHAEL L. HOFFMAN
ROBERT L. HOSKINSON
INVENTORS
BY Max Gelden
ATTORNEY

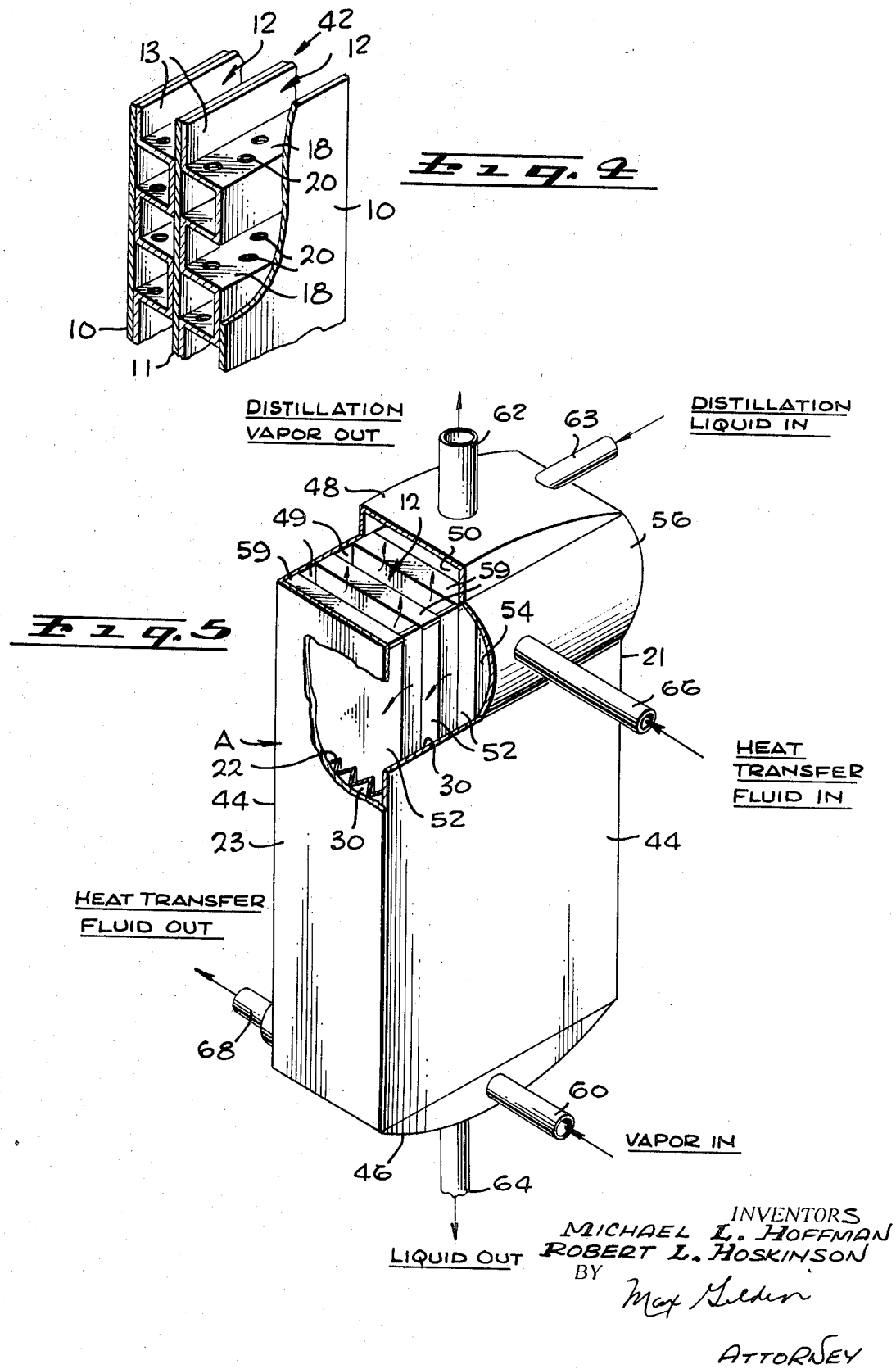

United States Patent Office 3,568,462
Patented Mar. 9, 1971

3,568,462
FRACTIONATING DEVICE
Michael L. Hoffman, Beverly Hills, and Robert L. Hoskinson, Pacific Palisades, Calif., asignors to McDonnell Douglas Corporation, Santa Monica, Calif.
Filed Nov. 22, 1967, Ser. No. 685,013
Int. Cl. B01d 3/16; F25j 3/00
U.S. Cl. 62—42                    9 Claims

ABSTRACT OF THE DISCLOSURE

Fractionating apparatus comprising vertically spaced partitions, each partition being substantially in a horizontal plane and extending across the column from one side wall to the opposite side wall, such partitions being apertured, and forming a series of enclosed spaces, such partitions preferably formed from a corrugated metal sheet, a vapor or vapor mixture to be separated passing upwardly through the holes in the partitions and in contact with a condensed liquid film flowing downwardly along the surface of the horizontal partitions and the vertical intermediate walls, providing an efficient fractionation. In a preferred embodiment, a plurality of such fractionating units are positioned parallel to each other, with a passage or passages for an external heat transfer fluid provided between adjacent units to supply heat to or to remove heat from the adjacent fractionating units.

This invention relates to fractionating apparatus, and is particularly concerned with novel fractionating structures and fractionating columns, embodying such structures to achieve more efficient fractionation.

The novel fractionating structures and column containing same of the invention are particularly employed in the processing of gaseous mixtures for liquefaction or for separation of the components of such mixtures, e.g., for the separation of components of air, or the components of gaseous mixtures of nitrogen and hydrocarbons such as methane, and the like. However, the utility of the invention apparatus is not limited to such applications.

Various types of internal packing in the form of plate-fin constructions have been designed in the prior art in an effort to obtain greater fractionation efficiency. One such design is that disclosed in U.S. Pat. 2,885,195. In such construction, inclined corrugated plates with slots therein are provided for passage of the liquid-vapor mixture being separated, liquid reflux passing downwardly through the channels collecting in the upwardly inclined troughs formed by the corrugations until it overflows through the slots, the vapor passing upwardly through the channels via the slots impinging on the liquid film flowing from the respective slots.

Although this type of construction seeks to achieve improved vapor-liquid contact, the surface density of the type of material employed in the construction of the above patent is only about one-third that of conventional plate-fin constructions. Further, and of particular significance, the construction of the above patent results in reduced heat transfer and has low structural strength, resulting in a low pressure rating. Thus, for example, constructions of the type of the above patent will generally only withstand pressures not in excess of about 100 p.s.i., whereas conventional plate-fin heat exchanger constructions will withstand pressures of the order of about 600 p.s.i.

According to the present invention, there is provided a fractionating apparatus or unit comprising a series of vertically spaced partitions extending upwardly, each partition being substantially in a horizontal plane and extending substantially across the heat exchanger or column, such partitions preferably being spaced equally, and having perforations or holes therein, which are preferably distributed in a uniform predetermined pattern over the surface of each of such partitions. Such partitions are disposed between walls connected to opposite sides of the apparatus and forming an enclosed space between adjacent vertically disposed partitions, with perforations or holes in both the lower and the upper adjacent partitions. Such partitions can be formed in preferred practice from a corrugated metal sheet having substantially square corrugations, the corrugated metal sheet being attached along its opposite longitudinally extending edges to opposite walls of the unit, and extending vertically in a zigzag pattern from the lower end to the upper end of the apparatus. The fractionating apparatus has an inlet at its lower end for introduction of a gas and an outlet at its upper end for removal of overhead vapors.

A gas to be liquified or a mixture of gases to be separated is caused to flow upwardly through the perforations in the respective vertically disposed partitions and into the spaces between adjacent partitions, impinging on liquid flowing downwardly from the respective partitions through the perforations therein and forming a liquid film on the under side of the partitions which flows downwardly along opposite sides of the walls between adjacent partitions to the upper surface of the partition below. According to another embodiment of the invention, a welded metal wire mesh instead of a perforated plate can be employed to provide the above noted perforated partitions, such metal wire mesh similarly being formed in a corrugated pattern as above described.

A series of the above-noted constructions can be placed in side-by-side relation between a series of parallel vertical walls or partitions. According to a preferred embodiment, a plurality of the above-noted fractionating elements can be disposed in alternate relation with a heat transfer pass or passage provided between adjacent fractionating elements. Thus, for example, there can be arranged alternate fractionating elements of the type noted above, spaced from each other by means of a spacer element, e.g., in the form of a vertically disposed corrugated spacer strip, forming vertical passages between the corrugations thereof, for passage of a heat transfer fluid therethrough in contact with adjacent fractionating elements.

The fractionating apparatus of the invention provides a more efficient vapor-liquid contact of the mixture undergoing fractionation, and at the same time, maintains the efficiency of the heat transfer surfaces. The novel fractionating apparatus of the invention permits both heat and mass transfer in an efficient manner.

The invention is described in further detail below in connection with the accompanying drawing wherein:

FIG. 1 is a perspective view, partly broken away, of a preferred embodiment of a multiple unit fractionating apparatus employing one type of fractionating unit or construction according to the invention;

FIG. 2 is an enlarged horizontal sectional detail taken on line 2—2 of FIG. 1;

FIG. 3 illustrates a modification of the invention apparatus;

FIG. 4 is a perspective view, partly broken away, showing a further modification of the invention; and FIG. 5 shows the fractionating apparatus of FIG. 1 assembled to form a fractionating column.

The showings in the drawings are understood to be only exemplary.

Referring to FIG. 1, there is shown a multiple fractionating unit A in which there is disposed between parallel vertical metal partitions 10 and 11, the fractionating unit 12 of the invention comprising a corrugated metal sheet 13 having substantially square corrugations 15, the adjacent surfaces of these corrugations being substantially at a 90° angle to each other. The longitudinally extending alternate vertical sides 14 and 16 of the corrugated sheet 13 are disposed in contact with the surfaces of the opposite partitions or walls 10 and 11, and are attached thereto as by soldering. Such corrugated metal sheet 13 forms a series of vertically disposed partitions or plates 18 positioned in parallel substantially horizontal position, and extending entirely across the fractionating apparatus or column from one side wall 21 to the opposite side wall 23 thereof, and from one vertical partition 10 to the adjacent vertical partition 11. Each of the horizontal plates or partitions 18 of corrugated sheet 13 has a series of perforations or holes 20 therein to permit upward passage of vapor from the space below one partition to the space above such partition, as indicated by arrows 19, and passage of liquid from the upper surface of a partition 18 through the perforations to and along the lower surface of such partition. As illustrated in detail in FIG. 2, the perforations 20 are preferably uniformly distributed in relatively close proximity to each other over the surfaces of each of the partitions 18, and can be arranged in rows, with the perforations in adjacent rows offset from each other, but such perforations can be arranged in the horizontal partitions 18 in any desired pattern, The size of such perforations can vary, and can range, for example, from about 0.01 to about 0.125 inch in diameter, and having a spacing such as to provide preferably about 25% to about 45% open area in each horizontal partition 18.

Thus, there is provided a series of vertically disposed enclosed spaces 25 formed by the square corrugations 15, between adjacent upper and lower horizontal partitions 18, the opposite walls of the vertical partitions 10 and 11, and the closed ends provided by the side walls 21 and 23.

A plurality of the above described fractionating units 12 are disposed in a multiple arrangement in parallel spaced relation to each other, as indicated in FIG. 1, sandwiched between passages formed by providing a vertically disposed corrugated metal spacer sheet 22 between vertical partitions 10 and 11 of adjacent fractionating units. The corrugated spacers 22 are each formed of a series of corrugations, see also FIG. 2, each disposed at an acute angle to the adjacent corrugation, with the apices 26 between adjacent corrugations 24 in contact with the opposite vertical partitions 10 and 11 and connected thereto as by soldering. Such vertically disposed corrugated spacer sheet 22 thus forms a series of vertical passages 27 extending from the lower to the upper ends of the unit.

In operation, a gaseous mixture to be separated or fractionated, passes upwardly as indicated at 28 in each of the fractionating units or sections 12, the gas flowing through the holes or apertures 20 from one partition 18 to the next adjacent upper partition, in contact with the liquid film on the lower and upper surfaces 29 and 31 of the respective vertically disposed horizontal partitions 18, and also in contact with the liquid film flowing along the inner vertical surfaces of sides 14 and 16 of corrugated sheet 13, and the opposite inner surface portions 10' and 11' of vertical partitions 10 and 11, respectively, forming the chambers or spaces 25 between adjacent horizontal partitions 18, providing intimate contact and equilibrium between the vapor and the liquid films with high efficiency. Simultaneously, a heat transfer fluid or medium is passed upwardly at 30, in the direction indicated by the arrows, or downwardly, if desired, through the vertical wedge shaped spaces 27 between adjacent corrugations of the corrugated spacer sheets 22, disposed between the respective distillation units 12, to effect a "differential" distillation in the fractionating or distillation units 12, by incremental heat addition to or heat withdrawal from units 12, along the length of such units.

Referring to FIG. 3, there is shown a modified form of fractionating unit according to the invention. In this embodiment, there is provided a corrugated sheet 32 formed in the same corrugated pattern as corrugated sheet 12 in FIG. 1, sheet 32, however, being a welded wire mesh sheet containing perforations 34. In this embodiment, each of the horizontal partitions 36, and also the vertical portions 38 and 40 of the corrugated sheet 32, contain the perforations 34. This wire mesh type of corrugated sheet generally provides a greater amount of liquid flow through the respective horizontal partitions 36 of the unit as compared to the perforated plate partitions 18 of FIG. 1.

Now referring to FIG. 4, there is shown a modification of the multiple fractionating unit of FIG. 1, wherein the heat exchange fluid passages 30 and corrugated sheets 22 therein of FIG. 1 are omitted, and wherein the fractionating units 12 are placed in vertical side-by-side relation with only the vertical partitions 10 and 11 separating the adjacent units, with no fluid heat exchange passage therebetween. Such a multiple unit fractionating system 42 is employed where it is not desired to utilize an external heat exchange fluid to add heat to or to withdraw heat from the respective fractionating units 12.

In FIG. 5 there is shown an assembly of the multiple unit fractionating apparatus A of FIG. 1, in a fractionating column. The unit A is disposed between a pair of end walls 44, and has a lower header 46 and an upper header 48. The upper ends 49 of the fractionating passages 28 of each of the fractionating units 12 are open and communicate with the chamber 50 within the header 48 at the upper end of the column. The upper ends of the heat exchange fluid passages 30 communicate through upper side openings 52 with a plenum or manifold 54 disposed across the column from side wall 21 to side wall 23, and formed by the curved sheet 56 attached to the column above one of the end walls 44. It is seen that the upper ends of the heat exchange fluid passages 27 are closed off at 59 from communication with the upper chamber 50.

An inlet 60 is provided in the lower header 46 and suitably arranged to conduct feed vapor to the lower ends of passages 28 of the fractionating units 12, and an outlet 62 is provided in the top of the upper header 48 to withdraw overhead vapor from the chamber 50 therein. A distillation liquid inlet 63, e.g., for supplying liquid reflux to the fractionating units 12, is also provided in the upper header 48, and a liquid outlet 64 is provided in the bottom of the lower header 46, and arranged to withdraw fractionated liquid from the bottom of passages 28 of the fractionating units 12. A heat transfer fluid inlet 66 is provided in member 56 to introduce such fluid into the manifold 54 and thence into the upper ends of the heat transfer fluid passages 30, and an outlet 68 is provided in the lower end of the column, and arranged to discharge heat exchange fluid from the lower ends of the passages 30. The flow of heat exchange fluid can be in the opposite direction, if desired, as indicated in FIG. 1.

The fractionating apparatus of the invention is of relatively simple and inexpensive construction, particularly when fabricated from a corrugated metal sheet as above described, and, unlike many prior art fractionating constructions, e.g., of the type illustrated in the above-noted patent, will withstand substantial pressures of the order of about 600 p.s.i. The structural components of the apparatus can be formed of any suitable metal such as aluminum, steel, copper, and the like. The construction of the invention provides highly efficient vapor-liquid contact and large heat transfer surfaces to augment heat transfer efficiency. The invention construction particularly provides both heat and mass transfer in a highly efficient manner.

Although we have described certain embodiments of the invention for purposes of illustration, it will be un-

We claim:

1. Fractionating apparatus comprising a unit having a pair of opposite spaced side walls, spaced parallel vertical partitions extending across said unit beween said opposite side walls, a series of vertically spaced horizontal partitions, each of said horizontal partitions extending entirely across said unit from one of said side walls to the opposite side wall, and each of said horizontal partitions extending entirely between said vertical partitions, forming a series of enclosed spaces each defined between adjacent spaced parallel partitions, the opposite side walls, and said spaced vertical partitions; each of said horizontal partitions having perforations therein, to permit upward passage of vapor from the enclosed space below one horizontal partition to the enclosed space above said partition and passage of liquid from the upper surface of one horizontal partition through the perforations therein to and along the lower surface of said partition, an inlet in the lower end of said unit for introduction of a gas, and an outlet at its upper end for removal of overhead vapors.

2. Fractionating apparatus as defined in claim 1, the perforations in said horizontal partitions being substantially uniformly distributed over the surface of each of said partitions, said partitions being formed of a corrugated metal sheet, said corrugated metal sheet being attached along its opposite longitudinally extending edges to opposite vertical partitions of said unit, and extending vertically in a zigzag pattern from the lower end to the upper end of said unit.

3. Fractionating apparatus as defined in claim 2, said corrugated metal sheet being a welded wire mesh sheet.

4. A fractionating apparatus as defined in claim 2, wherein said corrugated metal sheet has substantially square corrugations, the horizontal surfaces of said corrugations forming said vertically spaced horizontal perforated partitions, the size of said perforations in each of said horizontal partitions ranging from about 0.01 to about 0.125 inch in diameter and said perforations having a spacing to provide about 25 to about 45% of open area in each said horizontal partition.

5. A fractionating apparatus comprising a plurality of units as defined in claim 1, said units being disposed in parallel associated relation.

6. A fractionating apparatus comprising a plurality of units as defined in claim 1, said units being disposed in parallel spaced relation, and including spacer means positioned in the spaces beween side walls of adjacent fractionating units and providing a vertical passage for a heat transfer fluid between adjacent fractionating units.

7. A fractionating apparatus comprising a plurality of units as defined in claim 2, said units being disposed in parallel spaced relation, including a corrugated metal spacer sheet attached to opposite side walls of said adjacent spaced fractionating units, said spacer sheet extending across said apparatus between adjacent vertical partitions thereof, and providing a plurality of vertical fluid passages for a heat transfer fluid between adjacent fractionating units.

8. A fractionating column comprising a fractionating apparatus as defined in claim 6, said gas inlet being connected to the lower ends of each of said fractionating units and said outlet being connected to the upper ends of each of said fractionating units, and including a distillation liquid inlet to the upper ends of each of said fractionating units, a liquid outlet from the lower ends of each of said fractionating units, a heat exchange fluid inlet to said passages between adjacent fractionating units, and a heat exchange fluid outlet from said last-mentioned passages.

9. A fractionating column comprising a fractionating apparatus as defined in claim 7, said gas inlet being connected to the lower ends of each of said fractionating units and said outlet being connected to the upper ends of each of said fractionating units, and including a distillation liquid inlet to the upper ends of each of said fractionating units, a liquid outlet from the lower ends of each of said fractionating units, a heat exchange fluid inlet to said passages between adjacent fractionating units, and a heat exchange fluid outlet from said last-mentioned passages.

References Cited
UNITED STATES PATENTS

| | | | |
|---|---|---|---|
| 2,767,966 | 10/1956 | Chave | 202—158 |
| 2,767,967 | 10/1956 | Hutchinson | 202—158 |
| 2,918,265 | 12/1959 | Williams et al. | 261—112 |
| 3,013,781 | 12/1961 | Haselden | 202—158 |
| 3,256,704 | 6/1966 | Becker | 62—42 |
| 3,264,832 | 8/1966 | Van der Ster et al. | 62—42 |
| 3,346,246 | 10/1967 | Loetel et al. | 261—112 |

WILBUR L. BASCOMB, JR., Primary Examiner

U.S. Cl. X.R.

202—158, 236; 203—89; 261—112